United States Patent [19]
Braski

[11] Patent Number: 4,972,425
[45] Date of Patent: Nov. 20, 1990

[54] LASER FREQUENCY STABILIZATION

[75] Inventor: Michael T. Braski, Carlsbad, Calif.

[73] Assignee: Hughes Aircraft Company, Los Angeles, Calif.

[21] Appl. No.: 400,846

[22] Filed: Aug. 30, 1989

[51] Int. Cl.$^5$ .............................................. H01S 3/13
[52] U.S. Cl. ........................................ 372/32; 372/38
[58] Field of Search .................. 372/29, 32, 38, 33, 372/34, 92

[56] References Cited

U.S. PATENT DOCUMENTS 4,694,458  9/1987  Midavaine et al. .................... 372/32
4,856,010  8/1989  Wissman et al. ...................... 372/32

OTHER PUBLICATIONS

Pearson, G. N. and Hall, D. R.; "RF-Excited Tunable CO Laser with opto-Hertzian Frequency Stabilization"; IEEE Journal of Quantum Electronics, vol. 25, No. 3; Mar. 1989; pp. 245-248.

Jackson, P. E., Abramski, K. M. and Hall, D. R.; "Automatic Impedance Matching and Opto-Hertzian Effect in RF Excited $CO_2$ Waveguide Lasers"; Appl. Phys. B 47, 149-157 (1988).

Primary Examiner—James W. Davie
Attorney, Agent, or Firm—Joseph E. Szabo; Terje Gundmestad; Wanda K. Denson-Low

[57] ABSTRACT

Frequency stabilization in an RF excited carbon dioxide waveguide laser (10, 110, 210, 310) is obtained by employing as an imput to a dither stabilization feedback circuit (24, 124, 224, 324) an RF return power signal (62) that is a reflection of the exciting RF signal caused by mismatch of RF power source (14, 114, 214, 314) impedance and impedance of the laser cavity. The laser is operated so as to keep the RF return power from having its minimum magnitude. By employing an RF return power signal that is never at its minimum value, the system is insensitive to a wide range of thermal variation, and need for an optical laser output power sensor is eliminated.

11 Claims, 4 Drawing Sheets

_FIG. 3._

_FIG. 4._

LASER FREQUENCY STABILIZATION

BACKGROUND OF THE INVENTION

1. Field of the Invention

The present invention relates to methods and apparatus for stabilization of a laser and more particularly concerns laser frequency stabilization that is thermally insensitive.

2. Description of Related Art

Frequency stabilization of a laser, such as a carbon dioxide waveguide laser, for example, may be accomplished by changing laser cavity length. Use of a piezoelectric crystal transducer that carries one of the cavity reflecting end mirrors is one arrangement for changing cavity length. The piezoelectric transducer is driven from the output of a dither stabilizing circuit provided in a feedback loop and having as an input an optical or laser output power signal provided by a power detector that optically senses the laser output power signature. Laser power signature is a graph of the cyclical variation of output power plotted against change in cavity length. As cavity length changes (is "scanned") through one power signature cycle, the output power varies through a plurality of peaks. Each full signature cycle (which may have several power peaks) occurs over a cavity length variation that depends on lasing wavelength. This variation may be a few micrometers for certain wavelengths. As change in cavity length continues, the signature cycle is repeated.

The optical signature detector sensor is mounted with the laser output optics to sample a portion of the output energy beam and provides an output power feedback signal that is fed to a stabilization circuit. The feedback stabilization electronics is a phase comparison circuit that effectively interprets the optical power signature sensed by the detector and compares the phase of change in output power with the phase of a dither signal generated in the feedback stabilization electronics or associated circuitry to provide a control signal for the piezoelectric transducer. The latter, when energized by the output of the feedback circuit, changes cavity length, and therefore laser frequency, by an amount that tends to move the laser operating frequency back toward the peak of the laser gain curve upon which stabilization is centered.

The required use of an optical sensor or power detector in such frequency stabilization arrangements poses several problems. The detector requires additional optics which must be properly aligned and mounted adjacent the laser output optics. The detector adds weight and takes up space that may be quite valuable, particularly in lasers employed in military applications. Frequently some type of folding optics is required for operation of the power detector. Because the projected laser output beam must pass through the detector for power level sampling, the output beam is diminished and also may be distorted. The detector is expensive and delicate, thus adding to the cost and lack of laser reliability.

Problems with the optical detector have been recognized, as, for example, in the patent to Midavaine 4,694,458, which purports to offer a solution based on use of an RF (radio frequency) return signal in an RF excited $CO_2$ laser. The RF return is fed to a stabilization circuit that is arranged and controlled to vary cavity length so as to maintain a substantially minimum magnitude of the RF return and thus keep the laser operating at the desired peak of the laser gain curve. The patent to Midavaine describes a system which recognizes the fact that the laser impedance will vary with its light intensity, to thereby perturb the match between the output impedance of the RF exciting source and the laser cavity impedance. An impedance matching circuit is adjusted to achieve minimum RF return at the selected operating frequency and temperature. Mismatch of impedances causes the reflected RF signal (the RF return) to vary from its minimum. As laser frequency or temperature varies, the mismatch increases and RF return increases from its minimum. The patentees utilize this variation of the RF return from its minimum as an input to a feedback circuit that controls a piezoelectric crystal to change cavity length, and thus change frequency.

What is not mentioned or even considered in the system the Midavaine et al patent is the fact that the described arrangement can work only if the laser has highly precise operating temperature stabilization. This is so because the magnitude of the RF return signal varies not only with light intensity within the laser, but also with laser operating temperature.

Laser operating temperature may be considered as an average temperature of the laser device. It is affected by a number of factors, including the heat exchanger or other external cooling system employed to limit variation of operating temperature, and a change of input power to the cavity. Input power changes with variation of either frequency or output power of the RF excitation source, or with drift of components of the impedance matching circuit employed to couple RF power to the laser cavity. These factors involve other than laser light induced temperature variation that cause a change of laser cavity impedance.

Laser cavity impedance variations due to variations in laser operating temperature must be distinguished from impedance variations induced by laser light in order to ensure frequency stabilization over a range of temperatures. This distinction is neither recognized nor accomplished in the Midavaine et al patent.

For the Midavaine system to work, the impedance variation due to operating temperature must be made effectively negligible. The system of Midavaine requires the laser operating temperature range to be substantially minimized, or effectively near zero. Furthermore, the Midavaine system cannot lock on a power peak that is outside of the range of the cavity length adjusting device. The Midavaine arrangement is basically only a laboratory device that can tolerate a temperature variation in the order no greater than about 10°C. The Midavaine arrangement is not applicable to any real life or practical system that is subject to environmental temperature variation or the many tens of degrees experienced in some systems. In a military system, for example, a remotely operated laser may be turned on, after it has been at rest for some time, and may experience a temperature change from −50°C. to its operating temperature of +40°C. The laser must be frequency stabilized during warm up and during large environmental temperature changes. A laser system using the device of the Midavaine patent requires a complex, expensive and heavy temperature stabilizing heat exchanger.

The present invention not only avoids problems of the Midavaine et al system, but also avoids problems of optical power signature sensing of prior art systems by providing a non-optical signal for interpretation of laser signature.

It is an object of the present invention to provide laser stabilization that avoids or minimizes abovementioned problems.

SUMMARY OF THE INVENTION

In carrying out principles of the present invention in accordance with a preferred embodiment thereof, thermally insensitive laser frequency stabilization without the use of an optical detector is accomplished by operating the laser so as to prevent the RF return from having its minimum magnitude and employing such RF return to control the laser frequency. More specifically, in a laser having a laser cavity containing a lasing medium excited by an RF signal from an RF signal source to generate energy oscillations of a selected frequency in the cavity, and wherein the RF signal is reflected from the laser to provide an RF return signal having a minimum magnitude when impedance of the laser and source are matched, a stabilization method comprises operating the laser to cause the RF return to have a signature analogous to the power signature of the laser and employing the RF return to control the laser frequency. The laser is operated to cause the RF return to have a signature matching the laser output power signature and to have a magnitude greater than its minimum magnitude by any one of several techniques. In one method an impedance matching circuit is used to match the output impedance of the RF power source to the laser cavity impedance, so as to obtain a minimum RF return magnitude at a temperature well outside the expected operating temperature of the laser. Thus the RF return will never attain its minimum magnitude as long as the laser temperature remains within its expected operating range.

A second method for using an RF return signal for frequency stabilization and preventing the RF signal from being at its minimum magnitude comprises sensing the RF return signal magnitude, and when the sensed return magnitude approaches the minimum magnitude or a suitable threshold value, varying any one of (a) RF exciting source output power or (b) RF exciting source frequency or (c) a suitable component of the impedance matching network. Again the arrangement prevents the RF return magnitude from attaining its minimum.

Substantial temperature variation is handled by use of a feedback dither circuit that is not dependent upon operating within the maximum travel of the cavity length adjusting device, but can search for, find and lock on to a selected power peak in any one of a number of power signature cycles.

Some prior optical frequency stabilizing feedback systems are insensitive to thermal instability but require an optical sensor. The Midavaine et al arrangement does not require an optical sensor but does require high thermal stability. The present invention provides frequency stability without an optical sensor but remains insensitive to lack of thermal stability.

DESCRIPTION OF A PREFERRED EMBODIMENT

Figure 1:
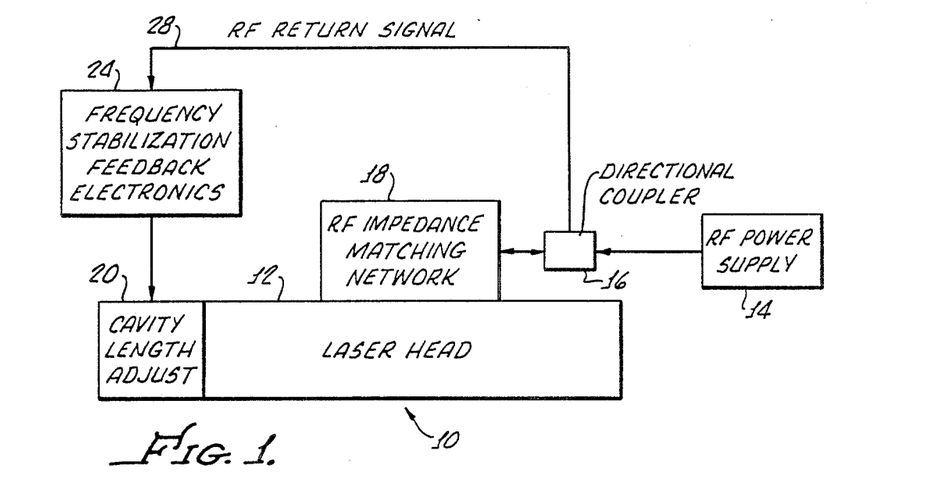
FIG. 1 is a block diagram of a frequency stabilized laser system employing principles of the present invention.

Illustrated in FIG. 1 is a system employing principles of the present invention for laser frequency stabilization. A carbon dioxide waveguide laser 10 includes a laser head 12 defining a laser cavity having exciting electrodes (not shown) for receiving a radio frequency (RF) exciting signal from an RF power supply 14. The exciting signal is fed to the laser cavity electrodes via a directional coupler 16 and an RF impedance matching network 18. The laser cavity includes end reflecting mirrors on either end of the cavity, one of which, such as the rear mirror, for example, is mounted on a cavity length adjustment device, such as a piezoelectric crystal 20. In some systems it is preferable to dither a fold mirror (in a folded laser) or even an optical element external to the cavity. The crystal is driven by a dither stabilization feedback circuit 24 which has as its input an RF return signal provided on a line 28 from the output of the conventional directional coupler 16.

The components described above may all be conventional components. The directional coupler may be the same as the directional coupler employed in the Midavaine et al Pat. No. 4,694,458. For operation over a limited temperature range the frequency stabilization electronics may be a conventional circuit or may be the same as that shown in the patent to Halmos et al, 4,660,206. A stabilization dither signal is generated in the stabilization electronics of the present application and may have a frequency lower than that of the Halmos et al patent. An alternative type of frequency stabilization electronics is employed in the lock-in stabilizer Model 80.215 system manufactured and sold by Lansing Research Corporation of Ithaca, NY. Basically the stabilization circuits are phase detectors which generate a dither signal that is fed to the piezoelectric crystal, causing a change in cavity length, which effectively shifts the laser operating frequency back and forth across the peak of the laser operating curve. Commonly the input to such a circuit, as shown in the Halmos et al Pat. No. 4,660,206, for example, is derived from an output power detector which receives a fraction of the laser output power. If the detected output power variation is in phase with the dither signal, the circuit operates to provide a voltage of one polarity to the piezoelectric transducer, and if the output power variation and dither signals are out of phase, a signal of opposite polarity is provided, causing the laser frequency to be driven back toward the peak of the gain curve, thereby stabilizing the frequency. When using a conventional dither stabilization circuit, which is unable to search for and lock on to a peak of any one of a number of signature cycles, the stabilization is limited to a narrow temperature range because a temperature change that causes a cavity length variation of a magnitude outside the range of piezoelectric crystal causes the feedback electronics to lose its frequency lock. To enable the system to achieve satisfactory frequency stabilization in the presence of greater ambient (and laser) temperature changes, it is preferred to use a dither stabilization circuit of the type shown in the co-pending application of Charles Wissman for Automatic Dither Stabilization of a Laser Cavity, Ser. No. 353,122, filed May 17, 1989, assigned to the assignee of the present invention. The disclosure of this co-pending Wissman patent application is incorporated by this reference as though fully set forth herein.

The dither feedback circuit of the Wissman patent application will search for, find and lock on to a desired peak in any one of a number of output power signature cycles. Therefore, this dither feedback permits use of the system over a wide temperature range, in the order of many tens of degrees Centigrade, wherein the laser cavity length will change by an amount equivalent to the length of many output power signature cycles, and through a distance greater than the maximum travel of the cavity length adjusting device. With the use of the dither feedback circuit of the Wissman application, the stabilization lock on to a selected peak of the signature cycle is not lost, as in prior systems, if the cavity length change is large.

In this system of Wissman, the feedback electronics automatically ramps up the piezoelectric crystal voltage to scan through one full signature cycle and selects and stores the value of the piezoelectric voltage that corresponds to the maximum value of the power sensor output that occurs during the scan. After the scan is completed the piezoelectric drive voltage is changed to attain a cavity length corresponding to the stored piezoelectric voltage, which places the voltage near the desired power peak. A dither signal is then initiated and the piezoelectric drive voltage is served to the desired power peak by use of simple digital techniques. Therefore, as used with the present invention, the feedback electronics of Wissman will search for, find, and lock on to a selected peak of the RF return power signal of any one of a number of RF signature cycles, and this will permit operation of the system over a wide range of temperatures.

In accordance with one feature of the present invention, the input to the stabilization circuit 24 is derived not from an optical detector but from the directional coupler which provides the reflected RF return signal. Uniquely, the system of the present invention is operated so that this RF return signal is never at its minimum magnitude.

The system described to this point, except for the major differences of non-minimum value of the RF signal and a modified feedback electronic circuit, is comparable to the system described in the Midavaine et al Pat. No. 4,694,458. However, it must be emphasized that the basic principle of the Midavaine et al system is to cause the RF return signal to have a minimum magnitude and in effect to maintain the RF return signal at its minimum magnitude. This of course is achieved by matching the RF output impedance of the RF power source to the impedance of the laser head (e.g. the laser cavity) in the Midavaine et al system. As pointed out above, this operation of the Midavaine et al system requires that the laser have a precisely controlled temperature and will not operate when the ambient temperature or the laser temperature varies in any significant or practical range.

Figures 8, 9:
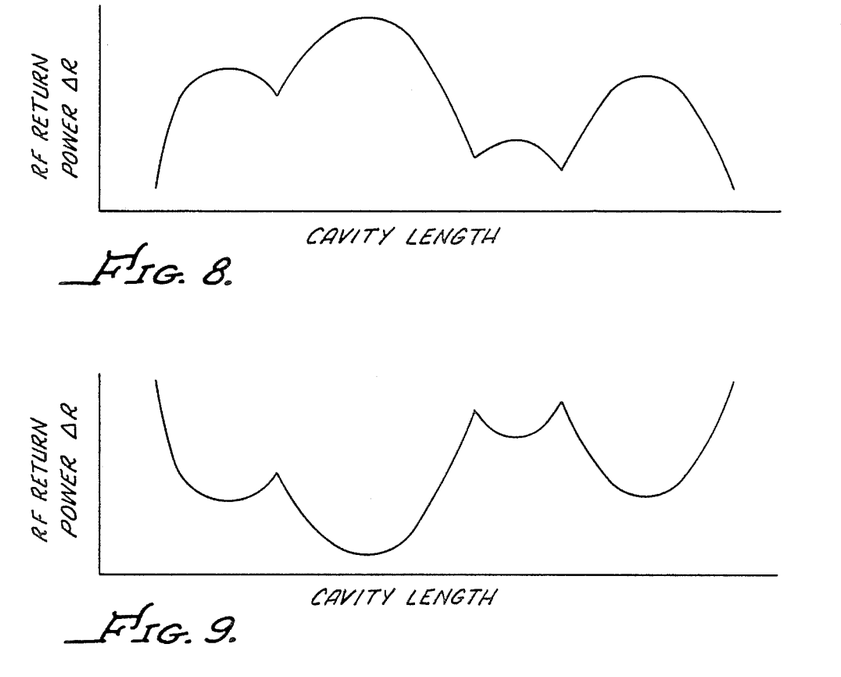
FIGS. 8, 9 and 10 are graphs of RF return power for different regions of discharge temperature.

Applicant has discovered that if the reflected RF signal, that is, the RF return, is prevented from attaining its minimum value for any frequency within the laser output signature, the system becomes effectively insensitive to temperature variation. Under such conditions the RF return signature, that is, variation of magnitude of the RF return with cavity length (as shown in FIGS. 8 and 9) is completely analogous to the laser output power signature (shown in FIG. 5). Therefore, the system can use the same electronic feedback stabilization networks, that is, the feedback dither stabilization circuit such as the Wissman circuit described above that was developed for use with an optical power sensing detector providing its input. The stabilization circuit can be employed as illustrated in FIG. 1 with this one constraint, namely preventing the RF return from attaining its minimum magnitude The non-minimum RF return can simply be substituted for output of the optical power detector previously employed for providing an input to the Wissman dither stabilization feedback circuit to generate a control signal that is fed to a cavity length adjusting device to stabilize laser frequency at a selected gain curve peak.

There are a number of methods for ensuring that the RF return signal does not attain its minimum value. One of these methods may be carried out with the system illustrated in FIG. 1. The laser head is driven with a power supply having RF frequency and RF output power stabilized over a preselected operating temperature range, but, by adjustment of the impedance matching circuit, the RF return is minimum at a temperature outside of the range of operating temperature. The laser temperature is initially brought to a temperature that is outside of the selected operating range, and, at this outside temperature, the impedance matching circuit is adjusted so that the RF return is minimum. Therefore, with the impedance matching circuit adjusted so that the RF return is at its minimum value at a temperature which is sufficiently outside the desired laser operating temperature range, it is certain that while the laser is within its desired operating range the RF return will never attain its minimum.

In a second group of methods for ensuring that RF return does not attain its minimum magnitude, one of the parameters of (a) RF source output power or (b) RF source drive frequency or (c) a component of the impedance matching network, is regulated through a feedback network that senses approach of the RF return magnitude to its minimum and adjust either the RF output power, RF drive frequency or an impedance matching network component to effect an increase in RF return magnitude.

Figure 2:
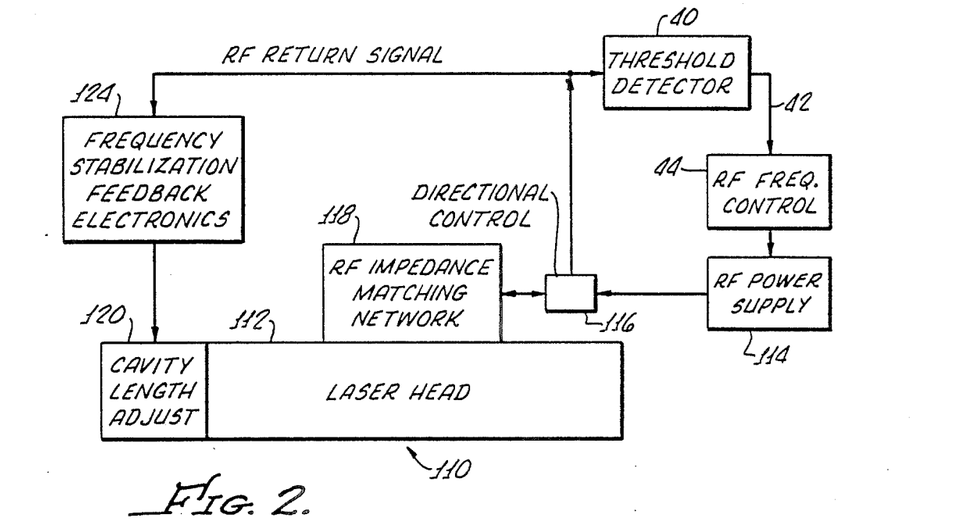
FIGS. 2, 3 and 4 are block diagrams illustrating frequency stabilized laser systems employing alternate arrangements for preventing RF return power from attaining its minimum magnitude.

Illustrated in FIG. 2 is a modification of the system of FIG. 1. Components corresponding to and the same as components of FIG. 1 are designated in FIG. 2 by reference numerals to which the quantity 100 has been added. Thus, a carbon dioxide waveguide laser of FIG. 2 is indicated at 100, the matching network at 118, the stabilization feedback electronics at 124, the laser head at 112, the power supply at 114, the directional coupler at 116, and the cavity length adjusting piezoelectric crystal at 120 In the modification of FIG. 2, adjustment of the impedance matching network 118 is performed at a laser discharge temperature within the laser operating temperature range to provide a magnitude greater than the minimum magnitude of the RF return. The temperature at which this adjustment is made is at one extreme of the designated laser operating temperature range (lower temperature extreme of a FIG. 8 type signature, and upper temperature extreme for a FIG. 9 type signature). A threshold detector circuit 40 is responsive to the RF return signal from coupler 116 to compare the magnitude of the RF return with a predetermined threshold or magnitude, and, when the threshold is crossed, to provide a control signal on a line 42 to an RF frequency control circuit 44 that is connected to vary the frequency of the exciting signal provided by the RF power supply. The RF drive frequency is varied so as to cause the RF return will increase, and thus the magnitude of the RF return will never obtain its minimum magnitude. The remainder of the system of FIG. 2 operates just as does the system of FIG. 1.

Figure 3:
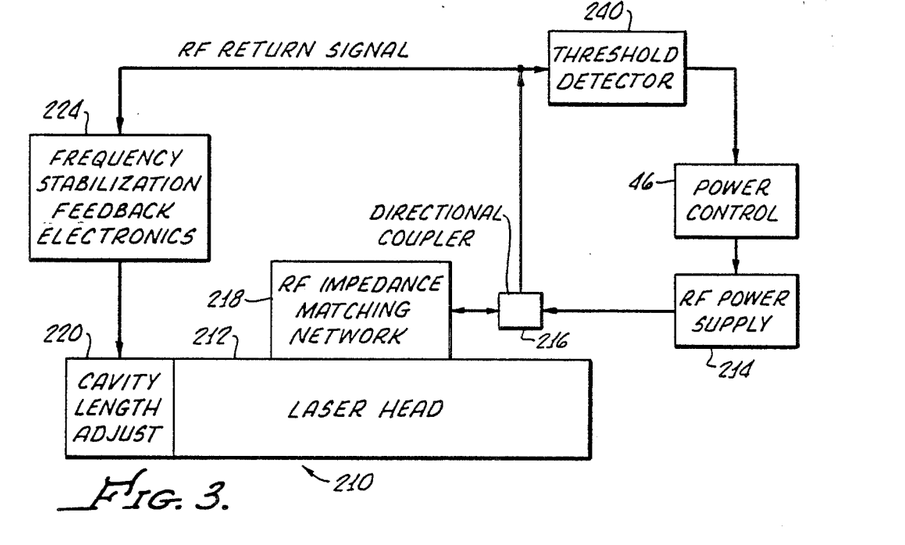

FIG. 3 is analogous to FIGS. 1 and 2. Operation is the same as in FIG. 2 except that RF power instead of frequency is varied. In FIG. 3 the components corresponding to components of FIG. 1 are designated by corresponding reference numerals which are increased by two hundred. Thus, in FIG. 3 there is disclosed a carbon dioxide waveguide laser 210, having a laser head 212, power supply 214, feeding an RF exciting signal through a directional coupler 216 and through an RF impedance matching circuit 218 to the laser head. Cavity length is adjusted by piezoelectric transducer 220, or other cavity length adjusting device, under control of feedback electronic circuit 224. In this case a threshold detecting circuit 220, which may be identical to the circuit 40 of FIG. 2, provides a signal to a power control circuit 46 that indicates the RF return magnitude is approaching its minimum. The power control circuit 46 provides an output signal that adjust the power supply 214 to cause the power of its RF exciting signal to vary so as to cause the magnitude of the RF return to increase.

Figure 4:
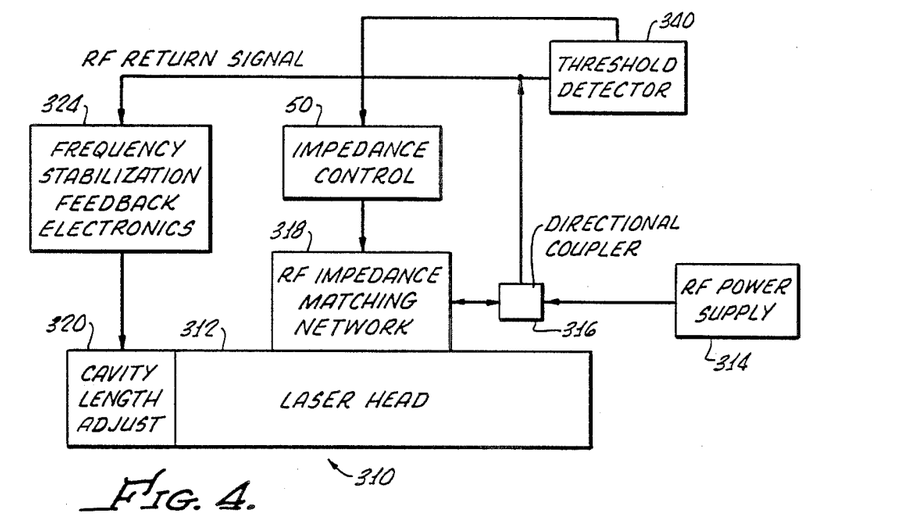

The arrangement of FIG. 4 is similar to that of FIGS. 1, 2 and 3, and again shows a system employing corresponding components denoted by similar reference numerals which have 300 added, so that a carbon dioxide waveguide laser 310, having a laser body or cavity 312 is driven from an RF power supply 314, which feeds an RF exciting signal to the laser head via a directional coupler 316 and an RF impedance matching network 318. The laser frequency is adjusted by a cavity length adjusting circuit or piezoelectric transducer 320 under control of a feedback electronic circuit 324. In this arrangement the impedance matching network 318 includes one or more variable magnitude components, such as a variable capacitor or variable inductance, of which the value is adjusted by an impedance control circuit 50 under control of the output of a threshold detector circuit 340, which may be identical to the threshold circuit detectors 40 and 240 of FIGS. 2 and 3, respectively. When the RF return signal crosses a threshold defined by the threshold detector, which threshold is close to the minimum magnitude of the RF return, the impedance control circuit 50 receives this threshold crossing indication and adjusts a component of the matching network 318 so as to increase the magnitude of the RF return signal. Operation of the system of FIG. 4 is otherwise the same as operation of the other embodiments.

It will be understood that the several systems illustrated in FIGS. 1, 2, 3 and 4 employ the same frequency stabilization feedback electronics. This feedback circuit may be a conventional dither stabilization circuit, as previously mentioned, if the system is to be operated in a very narrow temperature range. However, for enabling the system to be used over a wider temperature range, it is preferred to use a search and find circuit which will accommodate a cavity length change in the order of several output power signature cycles, and thus search for and lock on a selected peak in any signature cycle.

If the feedback electronic stabilization circuit does not include the search and find feature, there is still a significant advantage to be derived from operating the laser so as to keep the RF return power from attaining its minimum value. In such a situation a close and precise temperature stabilization within a narrow temperature range is required. Even so, there may be sudden power spikes which would throw off a frequency lock which was dependent solely upon sensing the minimum RF power level, and employing the present invention would significantly minimize such a problem.

As mentioned above, it is desired, in practice of the present invention, to keep the RF return signal from attaining its minimum value. This is so because when the RF signature is at value other than its minimum, the RF return signature is a direct analog of the laser output power signature, which the feedback stabilization electronics employs to operate upon in its search and find operation. If the RF return signal ever reaches or approaches its minimum value, the RF return signature has a different configuration which cannot be employed for the s search and find operation of the feedback electronics stabilization circuit.

The following discussion will provide a basis for understanding the importance of preventing the RF return signal from reaching its minimum.

Figure 5:
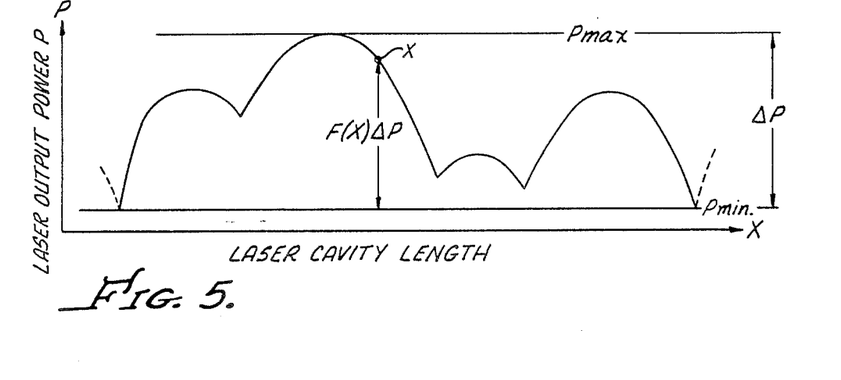
FIG. 5 is a graph showing a single cycle of a typical laser output power signature.
Figure 6:
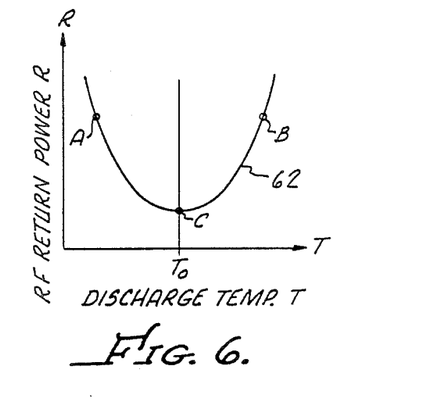
FIG. 6 is a graph illustrating variation of RF return power with laser discharge temperature.

A typical laser output signature for a carbon dioxide waveguide laser is depicted in FIG. 5. Point X on the signature curve represents an arbitrary frequency within the signature. The quantity $\Delta P$ is the output power variation over the signature, with such power varying from $P_{min}$ to $P_{max}$. For this discussion it is useful to consider how RF return power R varies with discharge temperature (e.g. temperature of the lasing plasma within the cavity). FIG. 6 presents a curve 62 that shows variation of RF return power R with laser discharge temperature T, where the RF return has been minimized at a discharge temperature of $T=T_O$. Laser input power and driving frequency for this discussion are assumed fixed. From the theory of laser light induced impedance variation, it is known that discharge temperature decreases as laser output power increases. Therefore, if the laser output power is varied by adjusting cavity length, the RF return power will vary in a manner dependent on the discharge temperature T, because the RF return power itself is dependent upon laser RF impedance, which in turn is dependent upon the discharge temperature, as indicated by curve 62 in FIG. 6.

Referring to FIG. 6, the dependence of RF return power upon discharge temperature may be stated for conditions below and above a temperature $T_O$ at which the RF return power is minimum. For temperatures below $T_O$ (at some point A), an increase in laser output power, with a concomitant decrease in discharge temperature, results in an increase of RF return power, and a decrease in laser output power (with an increase in discharge temperature) results in a decrease in RF return power. For temperature $T=T_O$ (at point C), any change in RF power, whether increase or decrease, results in an increase in RF return power. Finally, for temperature T that is greater than $T_O$ (at some point B), an increase in laser output power resulting in a decrease in discharge temperature, causes a decrease in RF return power, whereas a decrease in laser output power, for temperatures greater than $T_O$, results in an increase in discharge temperature and an increase in RF return.

Referring again to the laser power signature illustrated in FIG. 5, let the quantity $\Delta T$ be the change in laser discharge temperature that accompanies the laser output power variation $\Delta P$. $\Delta P$ is equal to $P_{max}$-$P_{min}$. Assume the output power associated with the arbitrary frequency point X of FIG. is given by $P_{min}+ F(x)\Delta P$, where $F(x)$ is equal to or between 1 and 0. To first order it may be assumed that $F(x)\Delta T$ is the change in discharge temperature associated with the laser output variation $F(x)\Delta P$. In other words, the discharge temperature change $F(x)\Delta T$ corresponds to an output power change $F(x)\Delta P$. It should be noted that $F(x)\Delta P$ is always greater than or equal to 0, whereas $F(x)\Delta T$ is always less than or equal to 0. In other words, the quantity $\Delta T$ is always non-positive, as will be understood from the fact that discharge temperature always decreases as output power increases.

Figure 7:
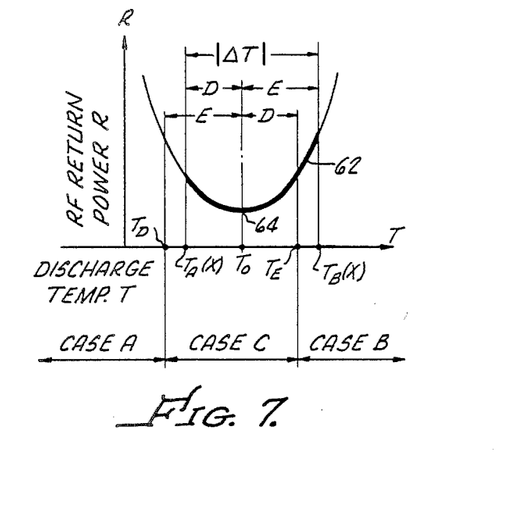
FIG. 7 is a graph similar to that of FIG. 6, useful in explaining certain aspects of the invention.

Assume now, for purposes of this discussion, that the RF return power curve of FIG. 6 is minimum for $T_O$ at the frequency point X of the signature of FIG. 5. As the laser cavity is scanned through the laser signature of FIG. 5, the discharge temperature varies within the range $|\Delta T|$ in a manner shown in FIG. 7. The graph of FIG. 7 shows the same curve 62 as is shown in FIG. 6, similarly plotting RF return power against discharge temperature, but has certain other indicia added thereto for expository purposes. Thus the curve 62 of variation of RF return power with discharge temperature is shown as a heavier thickness line within the range absolute value $|\Delta T|$. Since a general case is being considered, the minimum RF return power point 64 occurring at temperature $T_O$ need not be at a midpoint of the range absolute value $|\Delta T|$. The temperature value of the lower end of range absolute value $|\Delta T|$ is designated by $T_A(x)$, which is equal to $T_O+[1+F(x)]\Delta T$, and the upper end temperature range absolute value $|\Delta T|$ is designated at $T_B(x)$, which is equal to $T_O-[F(x)]\Delta T$. Not as previously stated, that $\Delta T$ is non-positive. Still referring to FIG. 7, it is also convenient to designate the temperature range between $T_A(x)$ and $T_O$ by the quantity D, and the temperature range between $T_O$ and $T_B(x)$ by the quantity E.

Now let the laser discharge temperature be varied from $T_O$ to some value $T_I$, because of thermal variations other than those which are laser light induced. If frequency stabilization is to be accomplished according to principles of the present invention, it is necessary that the laser discharge temperature not have a value of $T_O$. The reasons for this constraint are set forth below. To prevent the discharge temperature from attaining the value $T_O$, which is the temperature at which the RF return power is minimum, there are established two conditions in which, during scanning through the laser signature, the discharge temperature will not be $T_O$.

The first of these conditions may be termed case A, in which the discharge temperature at any value, such as $T_I$, is always less than $T_O+F(x)\Delta T$. The other of these conditions is termed case B in which the temperature $T_I$ is always greater than $T_O-[1-F(x)]\Delta T$. The discharge temperature will include the temperature $T_O$, as the signature is scanned, for a third case C wherein the temperature $T_I$ is greater than or equal to $T_O+F(x)\Delta T$ and less than or equal to $T_O-[1-F(x)]\Delta T$. These several conditions, case A, case B and case C, are denoted in FIG. 7, with C extending between the temperatures denoted as $T_D$ and $T_E$, case A comprising temperatures below temperature $T_D$, and case B comprising temperatures above temperature $T_E$.

To further explain the several cases, FIG. 7 illustrates that within the absolute temperature range $|\Delta T|$ temperature may vary above $T_O$ (e.g. may increase from $T_O$) by no more than the temperature difference E, which is the difference between $T_B(x)$ and $T_O$. This is the maximum that the temperature will vary above $T_O$ and still remain within the range $|\Delta T|$. we assume a temperature at some point below $T_D$ (for case A), we know that the maximum increase from such temperature would be the value E, giving an upper limit for case A of $T_O-F(x)\Delta T$ (remembering that $\Delta T$ is non-positive). In other words, one may identify the location of temperature $T_D$ (the upper limit of case A) simply by subtracting the quantity E from $T_O$.

Similarly, for case B, with the variation charge temperature still limited to the range temperature decrease from $T_O$ within such range is the quantity D, which is equal to $[1-F(x)]\Delta T$. Thus to select a temperature region above $T_O$ in with the variation within the range absolute $|\Delta T|$ will not reach $T_O$, one simply adds the quantity D to $T_O$ to reach the point $T_E$, which is the lower end of the range of case B. That is, case B includes temperatures greater than $T_E$, and case A includes temperatures less than $T_D$. At any temperature which includes $T_D$ or $T_E$, or at any temperature between the two, we have the case C in which it is possible that the RF return power, varying with the range absolute $|\Delta T|$, attain its minimum value, which occurs at temperature $T_O$.

Figure 10:
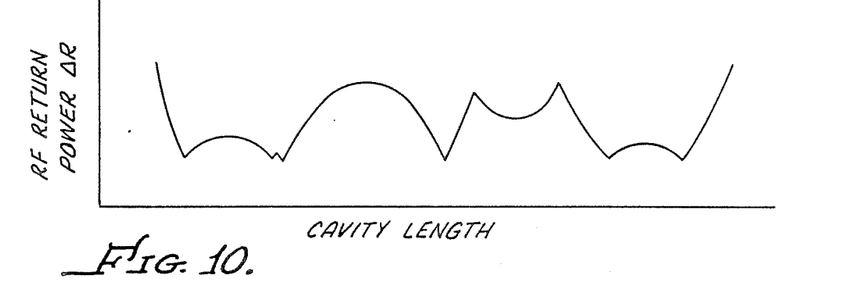

To explain advantages of the non-minimum RF return power, the RF return signatures may be plotted for each of the three cases, case A, case B and case C. FIG. 8 illustrates the return power signature for case A, where the temperature is always below the temperature $T_D$ of FIG. 7, plotting the RF return power $\Delta R$ against laser cavity length changes as induced by thermal variations other than laser light induced changes. FIG. 9 is a plot of the RF return power signature for case B, where temperature is always above the temperature $T_E$ of FIG. 7. FIG. 10 is a plot of the RF return signature for case C, where discharge temperature is equal to temperature $T_D$ or $T_E$ or any temperature there between.

The RF return signatures of FIGS. 8 and 9 are fully analogous to the laser output power signature of FIG. 5. Case B of FIG. 9 is an inverted version of case A of FIG. 8, but is nevertheless still fully analogous. The signature for case C of FIG. 10 is partially inverted and is not readily transformed to a signature analogous to the laser output signature. It will be recalled that the laser frequency stabilization feedback electronics is established to search for and lock on to a selected peak of the laser output power signature of FIG. 5. The same circuit may search for and lock on a selected peak of the RF return signatures of either FIG. 8 or FIG. 9, but will not operate on the signature of FIG. 10.

Therefore, a laser that is operated so that only RF return power signatures of case A (FIG. 8) or case B (FIG. 9) are produced may be frequency stabilized using the feedback stabilization electronic circuit which is identical to those used in optical feedback frequency stabilization and which require a particular output power signature. By operating the laser so as to prevent the RF return from attaining its minimum value, the RF return signature will provide a proper and useful input to the feedback stabilization electronics, but without the need for an optical sensor.

As mentioned above, the two basic methods of maintaining the RF return power above its minimum are (1) operation of the laser within a temperature range that does not include the temperature at which the RF return power is minimum (as by use of an external cooling system, for example), and (2) sensing approach of RF return power to its minimum value and changing either RF exciting power, or RF exciting frequency, or a component of the impedance matching circuit.

There have been described methods and apparatus for frequency stabilization of RF excited lasers that avoid use of an optical sensor and yet exhibit insensitivity to large thermal variations. This allows frequency stability during warm-up and eliminates need for a temperature stabilized heat exchanger. Simplification and cost reduction are thus provided for RF laser systems requiring frequency stability from turn-on or over a moderate to extreme temperature range, all without need for an optical power sensor.

What is claimed is:

1. In a laser having a laser cavity containing a lasing medium that is excited by an RF signal from an RF signal source to generate energy oscillations of a selected frequency in the cavity, said RF signal being reflected from the laser to provide an RF return signal having a minimum magnitude when impedance of said laser and source are matched, a method for stabilizing frequency of the laser comprising:
    operating the laser to cause the RF return to have a signature analogous to the power signature of the laser; and
    employing the RF return to control the laser frequency by scanning a signature of the RF return, selecting a predetermined point on said signature, and varying cavity length in a sense to maintain a selected magnitude of the RF return.

2. In a laser having a laser cavity containing a lasing medium that is excited by an RF signal from an RF signal source to generate energy oscillations of a selected frequency in the cavity, said RF signal being reflected from the laser to provide an RF return signal having a minimum magnitude when impedance of said laser and source are matched, a method for stabilizing frequency of the laser comprising:
    operating the laser to prevent said RF return from having its minimum magnitude by sensing magnitude of said RF return and varying said RF signal source to increase the RF return magnitude when the sensed RF return magnitude approaches said minimum magnitude; and
    employing the RF return to control the laser frequency.

3. The method of claim 2 wherein said step of varying said RF signal source comprises changing output power of said source.

4. The method of claim 2 wherein said step of varying said RF signal source comprises changing frequency of the RF signal generated by the source.

5. In a laser having a laser cavity containing a lasing medium that is excited by an RF signal from an RF signal source to generate energy oscillations of a selected frequency in the cavity, said RF signal being reflected from the laser to provide an RF return signal having a minimum magnitude when impedance of said laser and source are matched, a method for stabilizing frequency of the laser comprising:
    applying said RF signal to the laser via an impedance matching circuit;
    operating the laser to prevent said RF return from having its minimum magnitude by adjusting said circuit to increase impedance mismatch between said laser and source; and
    employing the RF return to control the laser frequency.

6. In a laser having a laser cavity containing a lasing medium that is excited by an RF signal from an RF signal source to generate energy oscillations of a selected frequency in the cavity, said RF signal being reflected from the laser to provide an RF return signal having a minimum magnitude when impedance of said laser and source are matched, the laser having a predetermined range of operating temperatures, a method for stabilizing frequency of the laser comprising:
    operating the laser by adjusting the RF return to have said minimum magnitude at a temperature of the laser outside of said range of operating temperatures and further operating the laser within said range of temperatures; and
    employing the RF return to control the laser frequency.

7. In a laser having a laser cavity containing a lasing medium that is excited by an RF signal from an RF signal source to generate energy oscillations of a selected frequency in the cavity, said RF signal being reflected from the laser to provide an RF return signal having a minimum magnitude when impedance of said laser and source are matched, apparatus for stabilizing frequency of the laser comprising:
    means for sensing magnitude of said RF return and varying said RF signal source to increase the RF return magnitude when the sensed RF return magnitude approaches said minimum magnitude;
    a laser frequency control device coupled with the laser; and
    means responsive to the RF return for operating the control device to control the laser frequency.

8. The laser of claim 7 wherein said means for varying said RF signal source comprises means for adjusting output power of said source.

9. The laser of claim 7 wherein said means for varying said RF signal source comprises means for adjusting frequency of the RF signal generated by the source.

10. In a laser having a laser cavity containing a lasing medium that is excited by an RF signal from an RF signal source to generate energy oscillations of a selected frequency in the cavity, said RF signal being reflected from the laser to provide an RF return signal having a minimum magnitude when impedance of said laser and source are matched, apparatus for stabilizing frequency of the laser comprising:
    applying said RF signal to the laser via an impedance matching circuit;
    means for adjusting said circuit to prevent said RF return from having its minimum magnitude;
    a laser frequency control device coupled with the laser; and
    means responsive to the RF return for operating the control device to control the laser frequency.

11. In a laser having a laser cavity containing a lasing medium that is excited by an RF signal from an RF signal source to generate energy oscillations of a selected frequency in the cavity, said RF signal being reflected from the laser to provide an RF return signal having a minimum magnitude when impedance of said laser and source are matched, the laser having a predetermined range of operating temperatures, apparatus for stabilizing frequency of the laser comprising:

operating the laser by adjusting the RF return to have said minimum magnitude at a temperature of the laser outside said range of temperatures, and operating the laser within said range of temperatures;

a laser frequency control device coupled with the laser; and means responsive to the RF return for operating the control device to control the laser frequency.

* * * * *